June 7, 1955  C. W. BRABENDER ET AL  2,709,914
APPARATUS FOR DETERMINING THE MOISTURE CONTENT OF MATERIALS
Filed Jan. 10, 1951  3 Sheets-Sheet 1
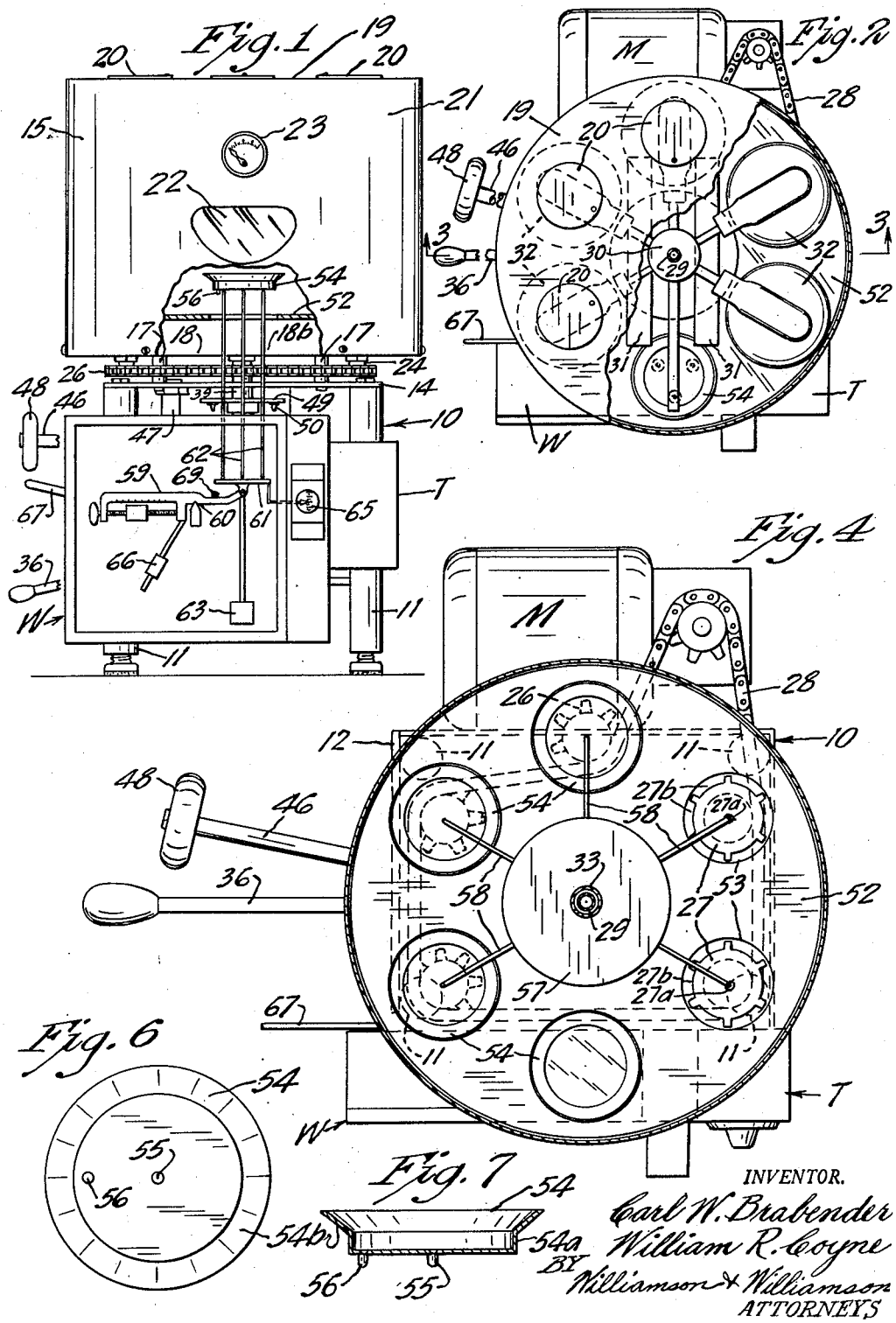
INVENTOR.
Carl W. Brabender
William R. Coyne
BY Williamson & Williamson
ATTORNEYS

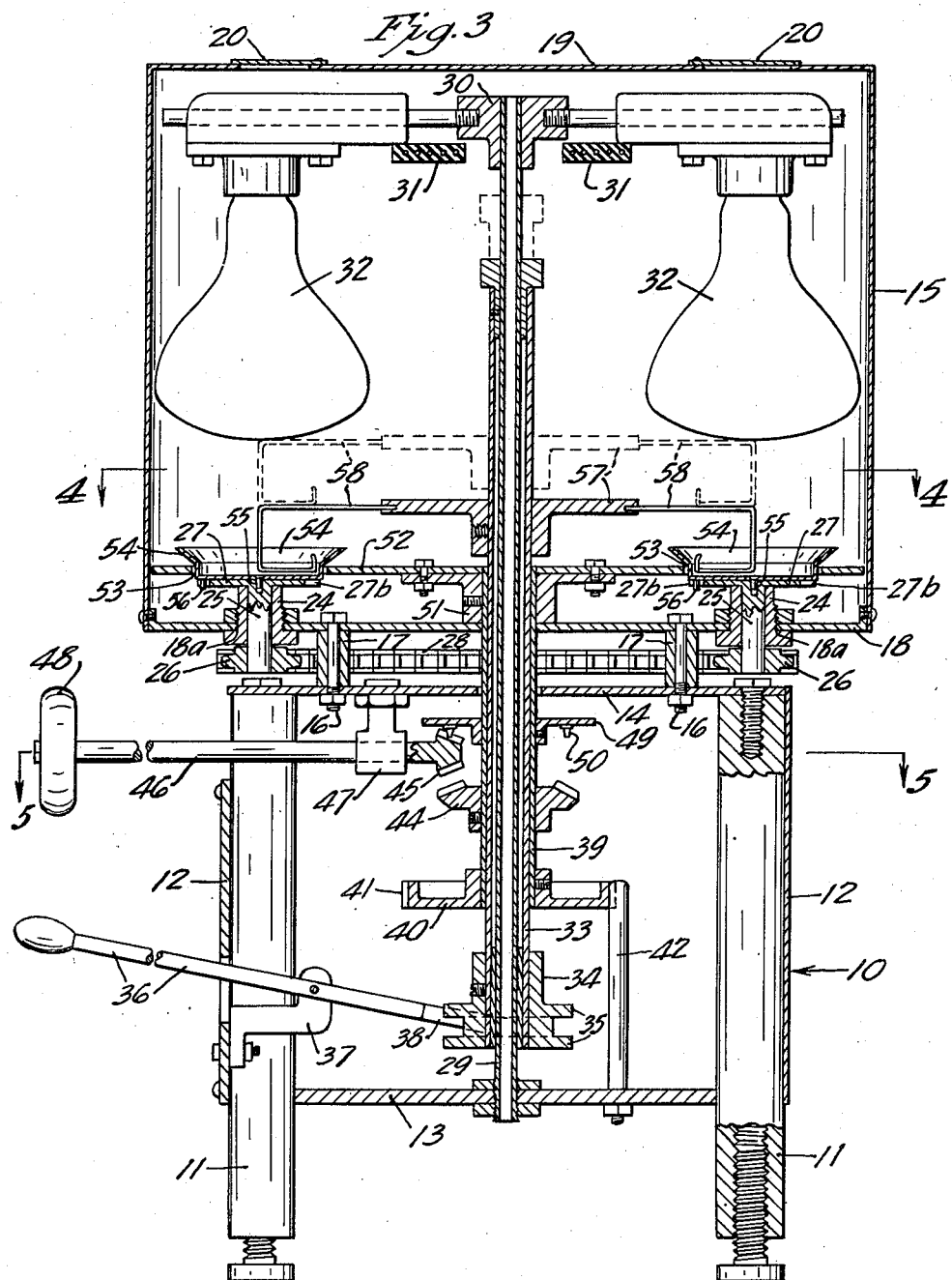

June 7, 1955  C. W. BRABENDER ET AL  2,709,914
APPARATUS FOR DETERMINING THE MOISTURE CONTENT OF MATERIALS
Filed Jan. 10, 1951.  3 Sheets-Sheet 3
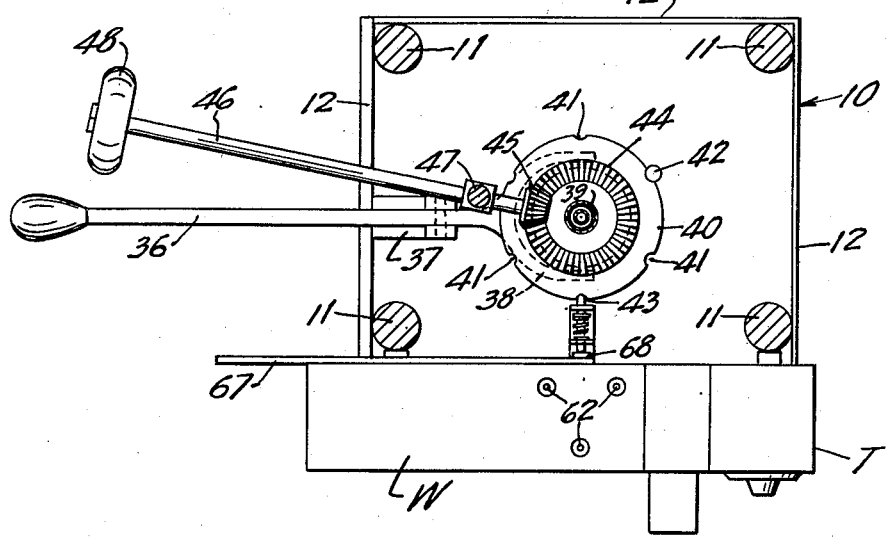
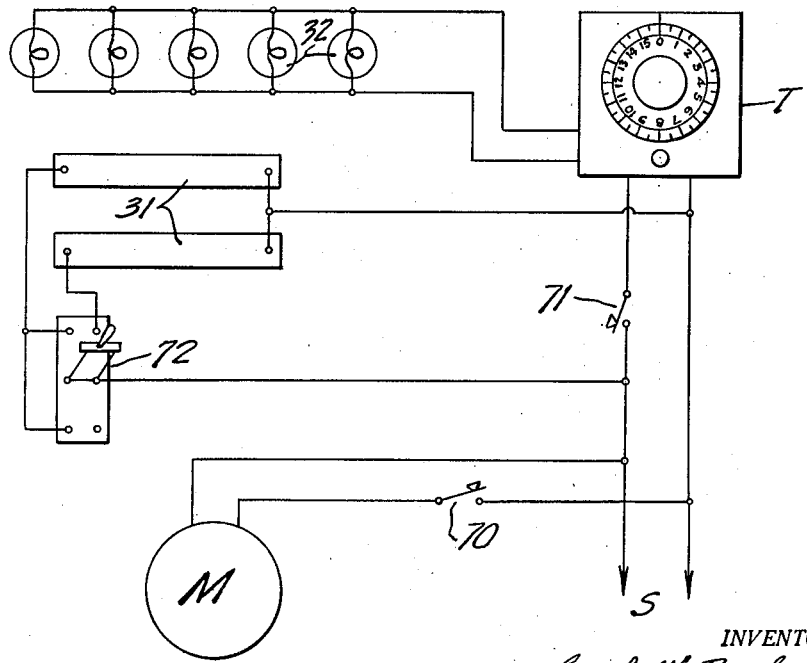
INVENTOR.
Carl W. Brabender
William R. Coyne
BY Williamson & Williamson
ATTORNEYS

United States Patent Office

2,709,914
Patented June 7, 1955

2,709,914

APPARATUS FOR DETERMINING THE MOISTURE CONTENT OF MATERIALS

Carl W. Brabender and William R. Coyne, Minneapolis, Minn., assignors to Pillsbury Mills, Inc., Minneapolis, Minn., a corporation of Delaware Application January 10, 1951, Serial No. 205,258

7 Claims. (Cl. 73—76)

This invention relates to apparatus for determining the liquid content of substances. More particularly, it relates to a novel and improved apparatus for rapidly evaporating liquids from such substances without oxidizing some of the substance itself and for determining the resultant loss of weight by weighing the same before and after such evaporation under controlled conditions.

This invention is an improvement on the moisture determining apparatus previously invented by one of the inventors of this invention as disclosed in Patent No. 2,047,765, which was issued by the United States Patent Office on July 14, 1936, to Carl W. Brabender. The present invention provides for an apparatus for quickly driving the liquid contents off from the substance the liquid contents of which is to be determined.

Prior to this time, the shortest recognized method for moisture content determinations of materials such as flour and the like has required a drying period of approximately one hour at a temperature of about 130° C. The shortest non-recognized method has required heating at temperatures in the neighborhood of 160° C. for a period of twenty minutes or longer. Each of these periods is objectionably long, for a great deal of time is necessarily consumed when using these methods in determining the moisture content of a large number of samples. Anyone skilled in the art would ordinarily expect that when a thin layer of material such as flour is subjected to infra-red heat the penetration of such heat would be more than sufficient to effectively dry the material. We have discovered, however, that this is not the case and that the length of time required to dry a given sample may be substantially reduced by repeatedly agitating the material and especially agitating the upper surfaces of such material. The apparatus to be described hereinafter have been invented by us with the goal in mind of substantially reducing the time required for such moisture determinations. We have been successful in reducing the period required for such determinations to a length of time approximating five to ten minutes. We have accomplished this by subjecting the materials to infra-red heat and at the same time agitating or plowing the materials while being subjected to such heat.

It is a general object of our invention to provide novel and improved liquid-content determining apparatus of relatively cheap and simple construction and operation.

A more specific object of our invention is to provide novel and improved liquid-content determining apparatus, the utilization of which will make it possible to make more rapid and substantially equally accurate liquid-content determinations.

Another object is to provide liquid-content determining apparatus which will positively agitate the substances the liquid contents of which are to be determined while they are being dried and which will repeatedly change the surface of such substances.

Another object is to provide liquid-content determining apparatus which will permit a plurality of samples of various substances to be dried simultaneously and rapidly and which will permit the actual weighing operation required in the liquid-content determinations to be accomplished in the same medium as in which it was dried and at the same time as the remaining samples are being positively agitated and dried.

Another object is to provide liquid-content determining apparatus which will make possible accurate liquid-content determinations for a plurality of substances within a minimum period of time.

These and other objects and advantages of the invention will more fully appear from the following description made in connection with the accompanying drawings, wherein like reference characters refer to the same or similar parts throughout the several views, and in which Fig. 1 is a front elevational view of one embodiment of our invention with a portion of the oven broken away to show the weighing mechanism in operation;

Fig. 2 is a top plan view of the same with the top of the oven broken away in part to show the interior of the oven;

Fig. 3 is a vertical sectional view taken along line 3—3 of Fig. 2;

Fig. 4 is a horizontal sectional view taken along line 4—4 of Fig. 3;

Fig. 5 is a horizontal sectional view taken along line 5—5 of Fig. 3;

Fig. 6 is a bottom view of one of the pans;

Fig. 7 is a vertical sectional view of one of the pans;

Fig. 8 is a wiring diagram of the electric connections utilized in the embodiment shown.

One embodiment of our invention may include, as shown in Figs. 1–8, a unit consisting of a frame indicated generally as 10 having a plurality of vertically adjustable legs 11, side plates 12, a lower plate 13, and an upper plate 14 extending between the collective legs 11. The upper plate 14, as shown, is rigidly secured to the upper ends of the legs 11 and the lower plate 13 is rigidly mounted by welding or any other suitable means between these legs.

Fixedly mounted upon the frame 10 in superimposed but spaced relation is an oven indicated generally as 15. This oven 15 is rigidly secured to the upper plate 14 by bolts 16 and is maintained in spaced relation therefrom by spacing collars 17. These bolts 16 are disposed somewhat centrally of the upper plate 14 and of the oven 15. The oven 15 is provided with a bottom wall 18 within which we have formed a plurality of equi-spaced apertures 18a adjacent its peripheral portions. As shown, these apertures are six in number but they may, of course, be utilized in any number desired. The top wall 19 of the oven is provided with a plurality of adjustable ventilators 20. The front side wall 21 is provided with a window 22 and a thermometer 23 which is adapted to indicate the temperature of the air within the oven 15.

Mounted in each of the apertures 18a with the exception of one indicated as 18b is a bearing 24 having mounted therein a rotatable shaft 25. Each of these shafts 25 is provided at its lower end with a drive gear 26 and at its upper end with a support plate 27. Each of the support plates 27 has a central recess 27a and a peripheral recess 27b A drive chain 28 is driven by a motor M to drive and rotate the collective rotator shafts 25 with their plates 27.

Rigidly mounted in upright position upon the central portion of the lower plate 13 is a hollow shaft 29. This hollow shaft 29 extends upwardly through the upper plate 14 and through the bottom wall 18 of the oven 15 to a point adjacent the top wall 19 of the oven. At its upper end a mounting plate 30 is rigidly secured thereto and this mounting plate carries a pair of electric heating elements 31 and a plurality of infra-red lamps 32.

One of these lamps 32 is disposed directly above each of the support plates 27.

Mounted on the hollow shaft 29 in free sliding relation with respect thereto is an inner sleeve 33 which extends upwardly to a point spaced below the mounting plate 30. Fixedly secured to the lower end portion of the sleeve 33 is a shift collar 34 which has a pair of spaced shoulders 35 thereon. A shift lever 36 is pivotally mounted on a mounting bracket 37 which in turn is mounted upon the front side plate 12. The inner end of the shift lever 36 carries a fork 38, the arms of which extend inwardly to engage the collar 34 between the shoulder members 35.

Mounted on the inner sleeve 33 in free sliding relation with respect thereto is an outer sleeve 39. This outer sleeve 39 is considerably shorter than the inner sleeve 33 and has fixedly mounted on its lower end a lock plate 40, the peripheral edge of which has formed therein a plurality of recesses 41 as best shown in Fig. 5. The number of these recesses 41 is greater in number by one than the number of lamps 32 or support plates 27. The recesses 41 cooperate with a lock post 42 which is rigidly mounted in upstanding position upon the lower plate 13 of the frame 10. These recesses 41 also cooperate with a spring pawl 43 to lock the outer sleeve 39 against rotational movement on its axis. This is best shown in Fig. 5.

Mounted on the outer sleeve 39 in spaced relation to and above the lock plate 40 is a bevel gear 44. This bevel gear 44 is fixedly secured to the sleeve 39 and positioned below a complementary bevel gear 45 which is formed on the inner end of a manually operated drive shaft 46. The drive shaft 46, as shown, is mounted for free rotational movement about its longitudinal axis within a depending bearing 47 which is rigidly secured to the upper plate 14 of the frame 10. As shown, the drive shaft 46 is provided with a handle 48. Also fixedly mounted on the outer sleeve 39 just above the cooperating bevel gear 45 is a retainer disc 49. This retainer disc 49 has a plurality of spaced depending teeth 50 which are disposed so as to engage the teeth of the bevel gear 45 when the retainer disc is in lowered position.

As shown best in Fig. 3 the sleeves 33 and 39 extend upwardly through the upper plate 14 and the bottom wall 18 of the oven into the interior of the oven itself. Fixedly mounted on the outer sleeve 39 above the bottom wall 18 is a collar 51 which has secured thereto a pan holder or tray 52. This pan holder or tray 52 is provided with a plurality of equally spaced apertures 53 and exceeds in number by one the number of support plates 27. The apertures 53 are disposed immediately above the support plates 27 and are of sufficient diameter to each snugly receive therein a pan 54. Each of the pans 54, as best shown in Figs. 6 and 7, is provided with a centering pin 55 and a drive pin 56. The centering pin 55 is adapted to be received into the centering recess 27a of the support plate 27 and the drive pin 56 is adapted to be received in the recess 27b of that plate. Each of the pans 54 has a vertical side wall 54a which flares outwardly as at 54b.

Fixedly mounted on the outer sleeve 39 above the pan holder 52 is a mounting collar 57. Extending outwardly from this mounting collar 57 is a plurality of depending stirring arms 58. These arms equal in number the number of support plates 27 and are arranged to extend downwardly to a point directly above such plates so as to extend within the confines of a pan 54 when such pan is supported by the plate 27. As best shown in Fig. 3, the stirring arms 58 extend outwardly to a point slightly beyond the center of the pan 54 and depend downwardly to a point where they will be in very close proximity to the bottom of the pan. The inner end of these stirring arms 58 extends sufficiently far toward the side of the pan to insure that all of the contents of the pan will be engaged and agitated when the pan 54 is rotated. The stirring arms 58 are preferably shaped as shown.

Mounted on the front side plate is a weighing mechanism indicated generally as W which is encased in a substantially closed compartment to prevent air currents from influencing the same. This weighing mechanism W is comprised of a steelyard 59 which is pivoted as at 60 and which is provided at its right hand end, as viewed in Fig. 1, with a plate 61 bearing a plurality of upstanding rods 62 and a dependent counterweight 63. As shown, the plate 61 is pivotally mounted on the right hand end of the steelyard and carries an indicator 64 which will provide a direct scale reading on the moisture percentage scale 65. The steelyard 59 is provided, as shown, with a counterbar 66.

Pivotally mounted on the inside of the front side plate is a lever 67 which has a cam 68 on its forward end and a control arm 69 extending at right angles from its medial portion to engage the right hand end of the steelyard 59 to withdraw the rods 62 from the pan holder or tray 52. A timing mechanism indicated generally as T is also provided to furnish a signal when the infrared lamps have been heating for a desired period.

Fig. 8 shows a diagrammatical view of the wiring involved in the operation of our device. The infra-red lamps 32 and the heating elements 31 are supplied with electricity by wires which extend therefrom downwardly through the hollow shaft 29. The source of electricity indicated generally as S in Fig. 8 provides the necessary current for the motor M when the switch 70 is moved to closed position. It also provides, through these wires, the necessary current for the timing mechanism T and the infra-red lamps 32 when the switch 71 is closed. The heaters 31 are connected in a manner such that either one or both may be heated at the same time by merely throwing in a double throw switch 72 into the desired position. As shown, in Fig. 8, neither of the heating elements 31 would be energized. As the switch 72 is thrown to its lower position, only the upper of the two heating elements shown in Fig. 8 will be energized. If the switch 72 is moved to its upper position as shown in Fig. 8, both of the heating elements will receive current.

In operation, the substances having the unknown liquid content are weighed out on a separate scale in desired weights such as 10 grams, and upon separate pans. The pans 54 are thereafter inserted into the oven 15 and positioned on their respective support plates 27. In order to do this, of course, the mounting collar 57 and the stirring arms 58 are in raised position. To move these arms 58 to raised position, the operator depresses the shift lever 36 to cause its fork 38 to move the shift collar 34 upwardly. The shift collar 34 will move upwardly through the sliding action of the sleeve 33 with respect to the hollow shaft 29 until the upper end of the collar 34 engages the lower surface of the lock plate 40. As it does this, the mounting collar 57 will move upwardly with the sleeve 33 to a level intermediate the levels shown in solid lines and in broken lines in Fig. 3. The movement of the collar 34 which takes place upwardly thereafter must necessarily cause the outer sleeve 39 to move upwardly therewith.

As the inner sleeve 33 moves upwardly carrying the outer sleeve 39 therewith, the lock plate 40, the bevel gears 44, the retainer disc 49, and the pan holder or tray 52 are carried upwardly because of their fixed mountings on the outer sleeve 39. Thus it can be seen that when the shift lever 36 has its outer end forced downwardly to its lower limit, the mounting collar 57 and the stirring arms 58 will be disposed in the position shown in broken lines in Fig. 3. At the same time, the pan holder or tray 52 will be moved upwardly to lift the respective pans 54 free from their respective support plates 24. At the same time, the retainer disc 49 will be lifted free of the bevel gears 45 and the bevel gears 44 will be brought into engaging position with the bevel gears 45.

Meanwhile the lock plate 40 will be forced upwardly to a position free of the lock post 42. The pans 54 may then be inserted into apertures 53 of the tray 52 and the moisture determining operation is ready to commence.

When the shift lever 36 is moved upwardly, the collar 34 is drawn downwardly and the respective parts once again assume the positions shown in solid lines in Fig. 3. While in these positions, the lock post 42 and the spring pawl 68 serve to lock the outer sleeve 39 and the pan holder or tray 52 from rotating on their axes. At the same time, the depending teeth 50 on the retainer disc 49 will engage the teeth of the bevel gear 45 to insure that this gear will at all times be properly oriented to receive the bevel gear 44 for cooperative action when the latter is raised sufficiently to engage the gear 45.

Prior to starting the motor M, it is desirable to heat the oven to the desired temperature. To facilitate such heating, the heating elements 31 may be utilized as described above. After the desired temperature has been reached, these elements may be cut out while the infra-red lamps 32 are permitted to continue to burn.

By closing the switch 70, the motor M is started and the drive chain 28 commences to drive the shafts 25 and their respective support plates 27. As the support plates rotate, their respective pans 54 will be engaged by the plate through the medium of the drive pin 56 and the recess 27b provided therefor. It should be noted that the lowering of the collar 34 permits the pan holder or tray 52 to move downwardly to a position such that the respective pans 54 will rest upon their respective support plate 27 and that it also permits the respective stirring arms 58 to be lowered to operative position within the confines of the pan 54.

As the pans 54 are rotated by their respective support plates 27, the substances contained therein will be rapidly agitated by the lower horizontal portion of the arm. It should be noted that the lower horizontal portion of the arms 58 extend to a point slightly beyond the center of each pan to insure that all of the substances will be engaged by the arm. Since the lower horizontal portion of the arm is disposed in close proximity to the bottom of the pan 54, the surface of the substances the moisture-content of which is to be determined, will be repeatedly changed. This repeated changing of the surface of the substance which is exposed to the heat generated by the infra-red lamps 32 permits the use of considerably higher temperatures than would otherwise be possible and facilitates the rapid evaporation of the liquids such as water contained in such substances. Without such stirring, a relatively low heat must be used for such drying process to avoid scorching of the substances contained within the pans. This is imperative since any scorching which takes place necessarily means that oxidation to a certain extent has occurred. Such oxidation always is accompanied by a corresponding loss of weight of the substance itself and thus would introduce substantial inaccuracies.

The rotation of the pans 54 with respect to the stirring arms 58 provides a stirring action within the substances contained in the pans which strongly resembles plowing. By positioning the horizontal portion of the stirring arms in close proximity to the bottom of the pans, the upper surface of the substances contained in the pans will fold under while the pans rotate and the material adjacent the bottom of the pans will be brought to the surface. Since this material will be relatively cool and since it will be exposed to the infra-red lamp only briefly before being again plowed under, a much more intense heat may be used through the infra-red lamp medium without serious danger of scorching. Thus it can be seen that the rate of evaporation of liquids from such substances will be greatly increased as a direct result of the mixing and the uniform and permeating heating throughout the mass of the substance.

After the substances contained in the pans 54 have been subjected to this repeated agitation beneath the infra-red lamps 32 for a period of five to ten minutes, we have found that substantially all of the moisture contained therein will have been evaporated. In fact, the errors involved in comparison with methods wherein the substances have been dried at a slower rate for a period of one hour or more are less than 0.1%. The respective pans and their contents are then ready for weighing. To determine the loss of weight resulting from the drying operation, the shift lever 36 is again swung to its downward position so that all of the pans 54 will be supported by the pan holder 52. By turning the handle 48, the bevel gear 45 will rotate the bevel gear 44 and, consequently, the pan holder 52 to a position where the pan desired to be weighed will be disposed directly above the opening through which the rods 62 may project upwardly. When the pan is at this point, the lever 67 is moved to its downward position to permit the steelyard 59 to perform the weighing operation. When the lever arm 67 is forced downwardly the control arm 69 will go upwardly and the rods 62 will extend upwardly through the tray 52 to elevate the pan 54 which has been just previously disposed thereabove. The percentage of moisture of the pan's contents will be indicated directly on the direct reading scale 65. At the same time, as the outer end of the lever 67 is moved downwardly, the upper end moves upwardly and carries its cam 68 to a position behind the spring pawl 43 to lock the same in position. Thus the operator is doubly insured against any inadvertent turning of the tray 52 with consequent injury to the steelyard 59.

The operation described above may be repeated for each of the respective pans. Thus it can be seen that the device may be used as desired, either first weighing out five samples of the desired weight and drying them all simultaneously and weighing them successively, or by placing one pan within the oven after each weighing operation to replace the pan just previously weighed and removed so as to make the operation continuous.

It should be noted that each of the stirring arms 58 when raised to its uppermost position comes in contact with its respective infra-red lamp 32. This contact jars the arm 58 slightly and insures that none of the substances the moisture content of which is to be determined clings to the arm 58 to cause inaccuracies in the determination.

We have found that temperatures ranging between 250 degrees to 350 degrees Fahrenheit within the oven 15 are preferable for these determinations. The heating elements 31 are utilized to bring the temperatures of the oven up to the desired level within a relatively short period of time when the determinations are being commenced. After the temperature has once reached the desired level, the lamps 32 will maintain the temperature level sufficiently without the use of the heating elements 31.

The agitation of the contents of the pan 54 is primarily responsible for the increased rate of evaporation made possible with our device. We have found that such agitation permits the use of higher temperatures during the drying operations. For example, whereas we could previously heat a substance at a given temperature for only three minutes without scorching, we may now heat the same substance for a period of thirty minutes without scorching as a result of the repeated changes made in the upper surface of the substance the moisture content of which is to be determined.

Thus it can be seen that we have provided novel and improved apparatus which makes it possible to make more rapid liquid-content determinations than was previously possible. These determinations are not only much more rapid but are also substantially equally accurate. It should be noted that our apparatus permits the determination of a plurality of samples to be engaged in at the same time and that each of the determinations will be consummated in a relatively short period of time.

It should also be noted that these determinations are made with the respective pans remaining within the interior of the oven itself so as to insure maximum accuracy in the determinations. In addition, while the weighing operation is performed on other samples, the remaining samples are being dried within the apparatus. Thus it can be seen that we have reduced to a minimum the amount of time required for such determinations and have provided apparatus which makes the operation highly practical and efficient.

It will, of course, be understood that various changes may be made in the form, details, arrangement and proportions of the various parts without departure from the scope of the present invention, which, generally stated, consists in the matter shown, and described and set forth in the appended claims.

What we claim is:

1. Moisture content-determining apparatus having in combination an oven, a plurality of pans adapted to be received within said oven and to contain granular-like substances the moisture content of which is to be determined, a revolvable pan-holding member within said oven provided with holes adapted to support said pans while containing granular-like substances the moisture content of which is to be determined, means for controllably revolving said member, rotator mechanisms for rotating at least some of said pans within said oven and relative to said member while the latter is not being revolved, stirring mechanism disposed above said rotator mechanism and extending within the confines of said pans while the latter are being rotated to thereby effectively agitate the upper surfaces of the substances contained therein, mechanism for facilitating the revolution of said pan-holding member to selectively position any one of said pans in a predetermined position for weighing, and weighing mechanism having means adapted to engage such positioned pan to weigh the same while disposed within said oven.

2. Moisture content-determining apparatus having in combination an oven, a plurality of pans adapted to be received within said oven and to contain granular-like substances the moisture content of which is to be determined, a revolvable tray within said oven provided with holes adapted to support said pans, the revolution of said tray being arrestable at predetermined positions, rotator mechanism positioned to engage and rotate at least one of said pans when said tray is at one of such predetermined positions, a stirring element mounted within said oven and extending within the confines of such a pan to engage and agitate the substances contained within the pan while the latter is being rotated by said mechanism, and weighing mechanism having means adapted to engage said pans selectively and to weigh the same while within said oven.

3. The structure defined in claim 2, said stirring element being mounted for limited vertical movement relative to said tray.

4. The structure defined in claim 2, said stirring element being of dimensions sufficient to extend from a point adjacent the side wall of said pan to a point beyond the center of the same whereby efficient stirring of all such substances contained within the pan may be assured.

5. Moisture content-determining apparatus having in combination an oven, a plurality of pans adapted to be received within said oven and to contain granular-like substances the moisture content of which is to be determined, a revolvable tray within said oven provided with holes adapted to support said pans, the revolution of said tray being arrestable at predetermined positions, rotator mechanisms positioned and operable to engage, elevate, and rotate at least some of such pans when said tray is at one of such predetermined positions, a plurality of stirring arms mounted for vertical movement one each above the respective positions of said pans when said tray is in one of such predetermined positions, each of said arms being capable of being lowered into its respective pan to engage and stir the contents thereof while the pan is being rotated and to thereby substantially increase the rate of the loss of moisture therefrom, and weighing mechanism having means adapted to engage such pans selectively and to weigh the same while within said oven.

6. In liquid content-determining apparatus for use in determining the liquid content of granular-like substances, the combination of an oven adapted to receive therein at least one pan containing such granular-like substances, mechanism for revolving such pan while within said oven, a stirring mechanism mounted within said oven to extend within the confines of such a pan while the latter is revolving to agitate whatever substances may be contained therein during such revolution to repeatedly bring different portions of said substances to the surface to prevent scorching, and weighing mechanism having means adapted to engage such a pan to weigh the same while disposed within said oven.

7. In moisture content-determining apparatus for use in determining the moisture content of granular-like substances, the combination of an oven adapted to receive therein at least one pan containing such granular-like substances, mechanism for revolving such pan while within said oven, agitator mechanism mounted within said oven and extending into the confines of such a pan and agitating whatever substances may be contained within such pan while the latter is being revolved, and weighing mechanism having means adapted to engage such a pan to weigh the same while disposed within said oven.

References Cited in the file of this patent

UNITED STATES PATENTS

| | | |
|---|---|---|
| 816,379 | Rommel | Mar. 27, 1906 |
| 1,945,196 | Kelly | Jan. 30, 1934 |
| 2,047,765 | Brabender | July 14, 1936 |
| 2,604,392 | Brown | July 22, 1952 |

FOREIGN PATENTS

| | | |
|---|---|---|
| 604,863 | Great Britain | July 12, 1948 |